United States Patent
Sakamoto et al.

(10) Patent No.: US 6,193,783 B1
(45) Date of Patent: Feb. 27, 2001

(54) APPARATUS AND METHOD FOR SUPPLYING A PROCESS SOLUTION

(75) Inventors: Kazuo Sakamoto, Kumamoto; Akihiro Fujimoto, Yatsushiro; Nobukazu Ishizaka, Kumamoto; Izumi Hasegawa, Tamana-gun, all of (JP)

(73) Assignee: Tokyo Electron Limited (JP)

(*) Notice: Subject to any disclaimer, the term of this patent is extended or adjusted under 35 U.S.C. 154(b) by 0 days.

(21) Appl. No.: 09/328,770

(22) Filed: Jun. 9, 1999

(30) Foreign Application Priority Data

Jun. 26, 1998 (JP) .................................. 10-180433

(51) Int. Cl.⁷ .................................................. B01D 19/00
(52) U.S. Cl. .................................. 95/26; 95/247; 95/266; 96/156; 96/193
(58) Field of Search ............................ 95/241, 243, 247, 95/266, 26; 96/155, 156, 157, 193

(56) References Cited

U.S. PATENT DOCUMENTS

| | | | |
|---|---|---|---|
| 4,915,713 | * | 4/1990 | Buzza et al. ........................... 95/266 |
| 4,935,151 | * | 6/1990 | Do ............................................ 95/266 |
| 5,096,602 | * | 3/1992 | Yamauchi et al. ..................... 95/241 |
| 5,584,416 | * | 12/1996 | Florian .................................. 95/266 |
| 5,792,237 | * | 8/1998 | Hung et al. ............................ 96/135 |
| 5,900,045 | * | 5/1999 | Wang et al. ........................... 96/155 |
| 5,989,317 | * | 11/1999 | Huang et al. .......................... 95/241 |

FOREIGN PATENT DOCUMENTS

| | | |
|---|---|---|
| 1-249162 | 10/1989 | (JP) . |
| 2-191571 | 7/1990 | (JP) . |
| 10-305256 | 11/1998 | (JP) . |

* cited by examiner

*Primary Examiner*—Duane S. Smith
(74) *Attorney, Agent, or Firm*—Fulbright & Jaworski, L.L.P.

(57) ABSTRACT

A process solution supplying apparatus including a solution source from which a process solution is supplied, a supply pipe having an upstream end and a downstream end and connected at the upstream end to the solution source, a nozzle connected to the downstream end of the supply pipe, a pump provided on the supply pipe, for supplying the process solution from the solution source to the nozzle, an upstream control valve provided on the supply pipe and located between the pump and the solution source, and a deaerating mechanism provided between the pump and the upstream control valve, for removing gases from the process solution.

14 Claims, 2 Drawing Sheets

APPARATUS AND METHOD FOR SUPPLYING A PROCESS SOLUTION

BACKGROUND OF THE INVENTION

The present invention relates to an apparatus and method for supplying a process solution, such as resist solution or developing solution to be applied to a semiconductor wafer or an LCD substrate. More particularly, the invention relates to an apparatus and method for supplying a process solution, which are suitable to deaerate the process solution, that is, to remove the dissolved gas from the process solution.

To perform photolithography during the manufacture of a semiconductor device, a process solution such as resist solution or developing solution is applied to a surface of a substrate such as a semiconductor wafer. As the minuteness and the integrated scale of the semiconductor circuit patterns recently become higher, it is demanded that the process solution be applied in highly controlled conditions.

To apply the process solution in highly controlled condition, deaeration of the solution must taken into consideration. The process solution, for example, resist solution, contains dissolved gas such as oxygen, nitrogen, argon, carbon dioxide, and the like. The dissolved gas may turn into bubbles in the resist solution while the solution is flowing through the solution applying tube. In this case, the solution applied to a substrate will form a film having an uneven thickness. Since the solution is applied to the substrate in a small amount of a few milliliters, the bubbles may greatly impair the thickness uniformity of the film, and thus the influence of the bubbles is not regregible.

Further, if the dissolved gas turns into bubbles as the solution flows through the solution applying nozzle, the bubbles will impair the precision of the amount of the solution applying to a substrate. This adversely influences the precision of forming a circuit pattern.

As indicated above, the process solution such as resist solution should be applied in highly controlled conditions to form a semiconductor circuit pattern. It is therefore desired that an apparatus and method be provided that can efficiently remove dissolved gas from a process solution.

BRIEF SUMMARY OF THE INVENTION

The present invention has been made in view of the foregoing, and its object is to provide an apparatus and method for supplying a process solution, which can accelerate transform of the gas dissolved in the process solution into bubbles, thereafter removing the gas from the process solution, and which can supply the process solution containing no gas.

To attain the object, according to the first aspect of the invention, there is provided a process solution supplying apparatus comprises: a solution source from which a process solution is supplied; a supply pipe having an upstream end and a downstream end and connected at the upstream end to the solution source; a nozzle connected to the downstream end of the supply pipe; a pump provided on the supply pipe, for supplying the process solution from the solution source to the nozzle; an upstream control valve provided on the supply pipe and located between the pump and the solution source; and a deaerating mechanism provided between the pump and the upstream control valve, for removing gases from the process solution.

Since the upstream control valve is provided between the pump and the solution source, a pressure is reduced in that part of the supply pipe which extends between the upstream control valve and the pump, when the upstream control valve is closed and the process solution is drawn from the pump. The pressure reduced (negative pressure) decreases the gas-solubility of the solution in this part of the supply pipe. This accelate the transform of the gas dissolved in the solution into bubbles. The deaerating mechanism therefore can remove the gas from the process solution.

Thus, no gas changes into bubbles in the downstream end of the supply pipe, and the process solution can be applied from the nozzle to a substrate at a constant flow rate. Further, as the process solution applied from the nozzle to the substrate contains no bubbles, the substrate is coated uniformly as desired.

Preferably, the process solution supplying apparatus has a control section which controls timing of opening and closing the upstream control valve and timing of drawing the process solution into the pump. It is also desired that the gas be removed from the process solution while the pump is operating to supply the solution to the nozzle.

It is desirable that the process solution supplying apparatus be a resist solution supplying apparatus which is designed to supply a resist solution to a resist coating apparatus.

Further, the pump may have a solution holding section for drawing and holding a predetermined amount of the process solution. In this case, it is possible to prevent the process solution from dripping from the nozzle while the gas is being removed from the process solution. In the case where the apparatus is used to supply a resist solution, it is desired that the solution holding section hold the resist solution in an amount which the resist coating apparatus applies to a substrate at one time.

Preferably, the process solution supplying apparatus further comprises a downstream control valve provided on the supply pipe and located between the pump and the nozzle. In this case, it is desired that the apparatus have a control section which controls timing of opening and closing the upstream and downstream control valves and timing of drawing the process solution into the pump.

To attain the object described above, according to the second aspect of the invention, there is provided a process solution supplying method for intermittently supplying a process solution by means of a pump, comprises the steps of:

closing a first solution passage provided at an upstream of the pump; drawing the process solution into the pump from the first solution passage, thereby generating a negative pressure in the first solution passage; opening the first solution passage; and discharging the process solution from the pump into a second solution passage provided at a downstream of the pump.

With this method it is possible to deaerate the process solution while the pump is being operated to perform a series of operation steps for drawing the solution in a predetermined amount and discharging the solution. Further, the solution can be effectively prevented from dripping while gas is being removed from the solution.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The process solution supplying apparatus according to the present invention is designed, for instance, to supply resist solution to a resist coating apparatus or developing solution to a developing apparatus, which are provided in a system for manufacturing a semiconductor device. One embodiment of the invention, which is an apparatus for supplying resist solution to the resist coating apparatus, will now be described.

[Basic Structure]

Figure 1:
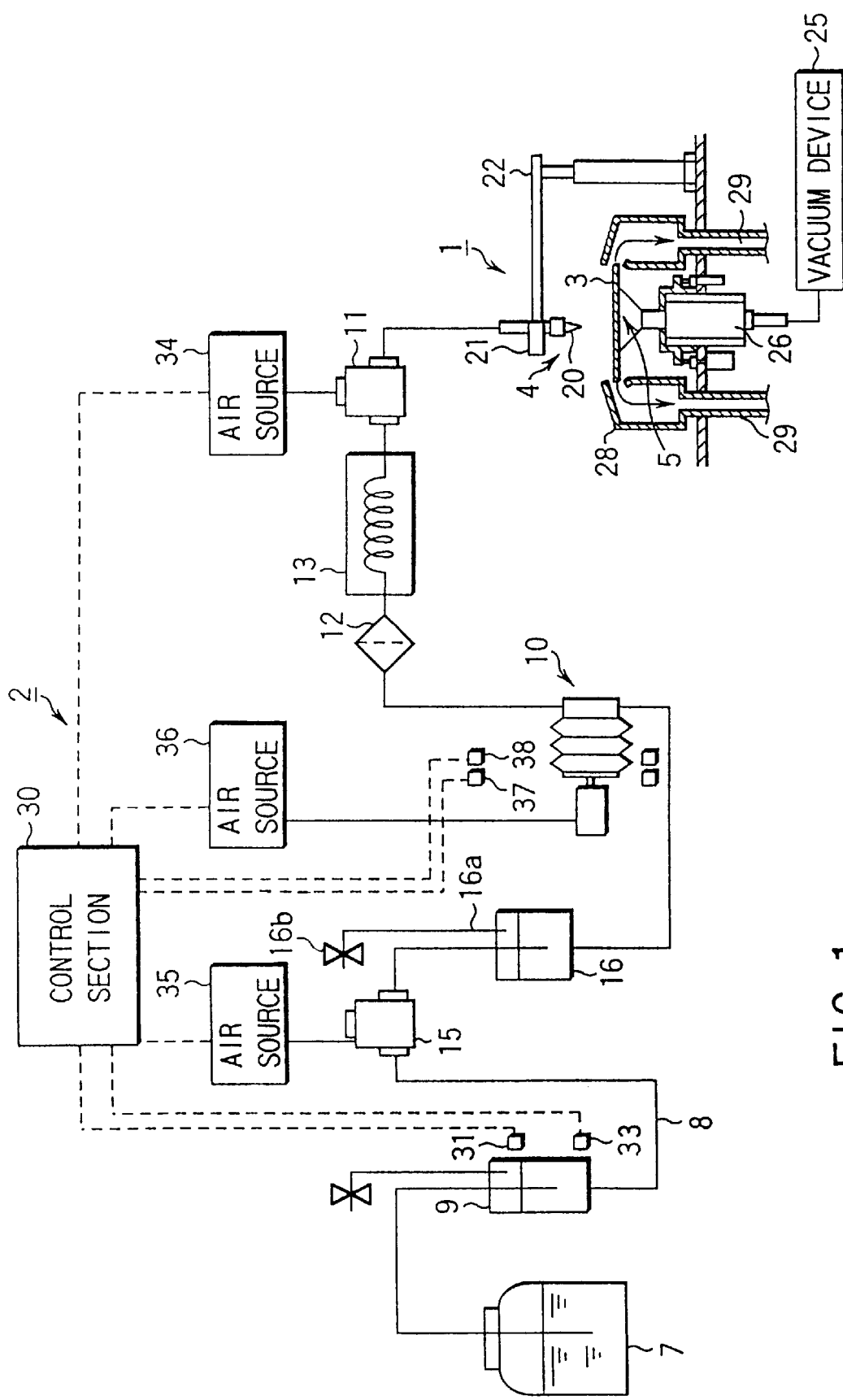
FIG. 1 is a schematic representation of an embodiment the present invention.

FIG. 1 shows the resist coating apparatus 1 provided in an apparatus for manufacturing a semiconductor device. Also shown in FIG. 1 is the resist solution supplying apparatus 2 connected to the resist coating apparatus 1.

The resist coating apparatus 1 has a nozzle unit 4 and a spin chuck mechanism 5. The nozzle unit 4 drips resist solution (process solution) onto the surface of a wafer 3 (substrate). The spin chuck mechanism 5 holds the wafer 3 by suction force and rotates the wafer 1. As the mechanism 5 rotates the wafer 1, the resist solution dripped onto the wafer 3 is spread. The entire surface of the wafer 3 is thereby coated with the resist solution.

The resist solution supplying apparatus 2 has a resist solution tank 7 (process solution source) and resist solution pipe 8. The resist solution tank 7 stores a resist solution (processing solution). The resist solution pipe 8 extends from the resist solution tank 7 and is connected to the nozzle unit 4 of the resist solution supplying apparatus 2. An intermediate tank 9, a single-action pump 10 (bellows-type pump), and a downstream control valve 11 (air operation valve) are provided on the resist solution pipe 8. The intermediate tank 9 is designed to measure such the amount of the solution remaining in the solution tank 7. The single-action pump 10 intermittently supplies the resist solution toward the resist coating apparatus 1. The downstream control valve 11 cooperates with the pump 10 to control the timing of supplying the resist solution toward the resist coating apparatus 1.

As shown in FIG. 1, a filter 12 and a water jacket 13 are provided on the resist solution pipe 8 and located between the single-action pump 10 and the downstream control valve 11. The filter 12 removes impurities from the resist solution. The water jacket 13 controls the temperature of the resist solution.

In the present invention, the single-action pump 10 is a volume-variable pump which draws liquid when it expands. An upstream control valve 15 is provided on the resist solution pipe 8 and located between the pump 10 and the intermediate tank 9. Further, a gas collecting tank 16 (bubble collector) is provided on the resist solution pipe 8 and located between the control valve 15 and the pump 10. The tank 16 has an exhaust pipe 16a and a valve 16b for opening and closing the pipe 16a. When the pump 10 draws the resist solution, the upstream control valve 15 is closed. A prescribed negative pressure (pressure-reducing) is thereby exerted on the resist solution flowing between the pump 10 and the control valve 15. As a result, the gas dissolved in the resist solution turns into bubbles. The bubbles are collected, in the form of a mass of gas, into the gas collecting tank 16. The gas is exhausted from the gas collecting tank 16 through the exhaust pipe 16a when the valve 16b opens the pipe 16a.

Next, the resist coating apparatus 1 will be described in brief, and the resist solution supplying apparatus 2 that has the above-described deaeration mechanism will then be described.

[Resist Coating Apparatus]

As indicated above, the resist coating apparatus 1 has the nozzle unit 4 and the spin chuck mechanism 5. Both the nozzle unit 4 and the spin chuck mechanism 5 are held in a chamber (not shown). The chamber is connected to a gas supplying/exhausting system (not shown), whereby a prescribed process atmosphere is maintained around the spin chuck mechanism 5. A wafer transfer arm (not shown) transfers the wafer 3, i.e., the substrate to be processed, into the chamber. In the chamber, the wafer 3 is placed on the spin chuck mechanism 5.

The nozzle unit 4 has a resist coating nozzle 20, a holder 21, and a nozzle drive mechanism 22. The nozzle 20 drips the resist solution onto the wafer 3. The holder 21 holds the resist coating nozzle 20. The drive mechanism 22 moves the holder 21 in, for example, Zθ direction.

The resist coating nozzle 20 is secured to the lower surface of the holder 21 and opposes the wafer 3 placed on the spin chuck mechanism 5. The holder 21 couples the nozzle 20 to the resist solution pipe 8 that extends from the resist solution supplying apparatus 2.

When the nozzle drive mechanism 22 drives the holder 21, the resist coating nozzle 20 is positioned at a position, where the nozzle 20 opposes a desired part of the wafer 3. The resist solution supplying apparatus 2 supplies the resist solution to the resist coating apparatus 1, in a prescribed amount and at a predetermined time. Then, the resist coating nozzle 20 drips the resist solution onto the wafer 3.

As shown in FIG. 1, a vacuum device 25 and a drive mechanism 26 are connected to the spin chuck mechanism 5. When the vacuum device 25 is driven, it generates a suction force, thereby holding the wafer 3 on the spin shuck mechanism 5. When driven by the drive mechanism 26, the spin chuck mechanism 5 rotates the wafer 3, generating a centrifugal force. Thanks to the centrifugal force, the resist solution applied to the wafer 3 spreads all over the surface of the wafer 3. As a result, the entire surface of the wafer 3 is coated with the resist solution.

The spin chuck mechanism 5 is arranged in a cup 28. Excess of the resist solution applied to the wafer 3 is removed from the wafer 3 as the mechanism 5 rotates the wafer 3. The excessive solution hits the inner surface of the cup 28 and subsequently flows down to the bottom of the cup 28. A drain pipe 29 is connected at one end to the bottom of the cup 28 and at the other end to a collecting tank (not shown). The excess solution is drained from the cup 28 through the drain pipe 29 and is ultimately collected in the tank (not shown).

[Resist Solution Supplying Apparatus]

The resist solution supplying apparatus 2 connected to the nozzle 20 will now be described in detail.

Figure 2:
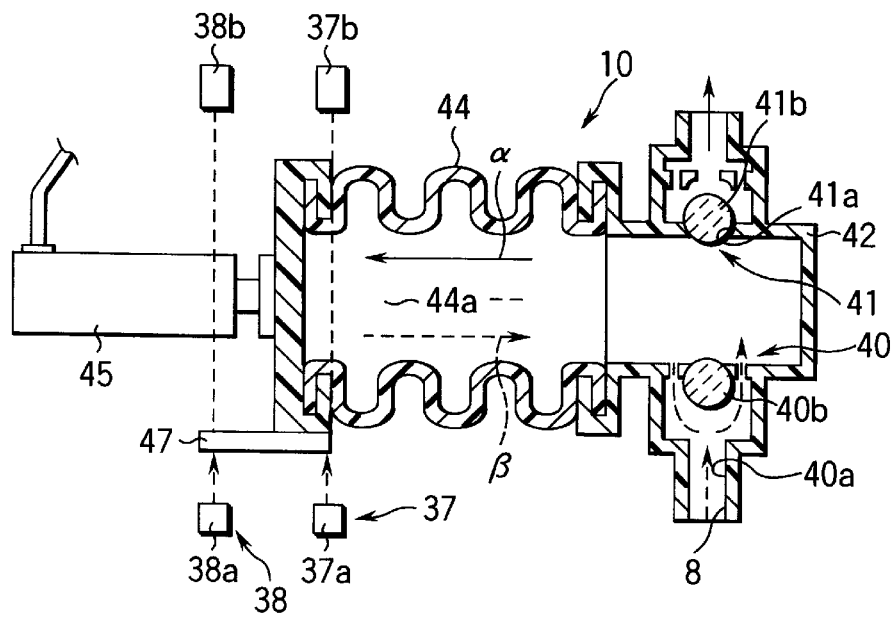
FIG. 2 is a longitudinal sectional view of the single-action pump incorporated in the apparatus shown in FIG. 1.
Figure 3:
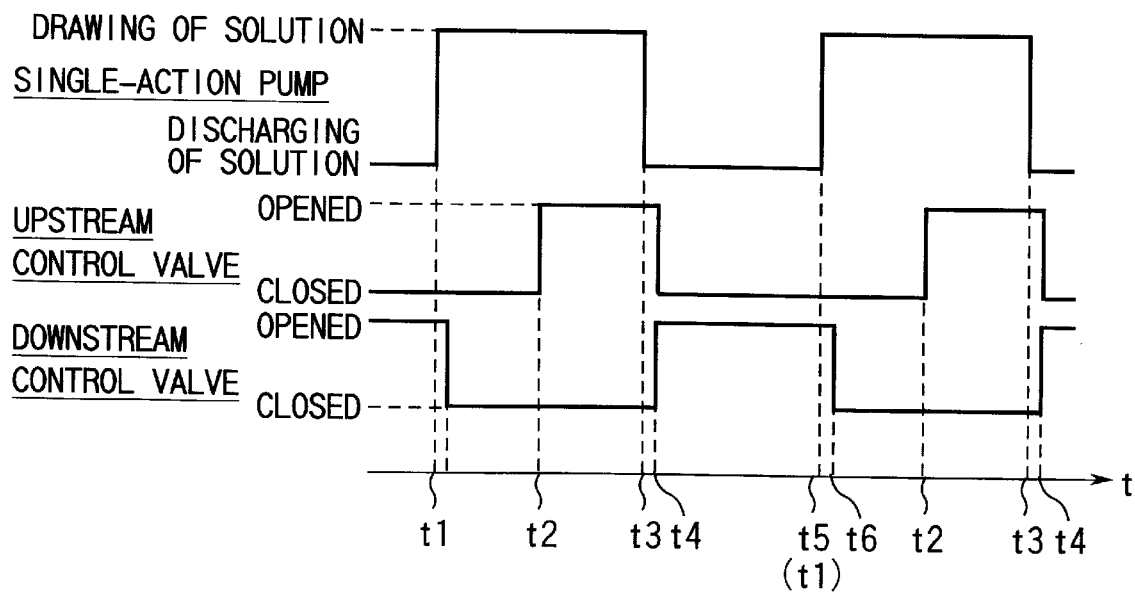
FIG. 3 is a timing chart explaining the step of deaerating a process solution, the step of drawing the solution and the step of applying the solution, all performed in the embodiment shown in FIG. 1.

The resist solution supplying apparatus 2 of the present invention is characterized in that the downstream control valve 11, single-action pump 10, upstream control valve 15 and gas collecting tank 16 are provided on the resist solution pipe 8 as described above. The valves 11 and 15, pump 10 and tank 16 constitute a deaeration mechanism. FIG. 2 is a schematic representation of the single-action pump 10, and FIG. 3 is a timing chart explaining the timing of operating the pump 10 and the valves 11 and 15.

The system for controlling the resist solution supplying apparatus 2 will be described, with reference to FIG. 1.

As shown in FIG. 1, a control section 30 is provided to control the resist solution supplying apparatus 2. A limit sensor 31 and an emptiness sensor 33 are provided on the intermediate tank 9 and connected to the control section 30. The sensors 31 and 33 detect the level of solution in the intermediate tank 9. In accordance with the level of solution detected, the control section 30 determines when the resist solution tank 7 should be replenished.

The control section 30 is connected to air sources 34 and 35, which are provided to supply operating air to the downstream control valve 11 and the upstream control valve 15, respectively. Namely, the control valves 11 and 15 are air-operated valves: they are operated with compressed air. Under the control of the control section 30, the air sources 34 and 35 supplies compressed air to the control valves 11 and 15, respectively. Operated with the air, each of the control valves 11 and 15 opens or closes the solution passage formed in the resist solution pipe 8.

Further, the control section 30 is connected to an air source 36 and sensors 37 and 38. The air source 36 is provided for operating the single-action pump 10. The sensors 37 and 38 detect the operating state of the single-action pump 10.

FIG. 2 is a longitudinal sectional view of the single-action pump 10. As shown in FIG. 2, the single-action pump 10 comprises a main body 42, bellows 44, and an air cylinder 45. The main body 42 has an inlet valve 40 and an outlet valve 41. The bellows 44 are secured at one end to main body 42 and define a volume-variable pump chamber 44a (process solution holder). The other end of the bellows 44 is connected to the air cylinder 45. The air cylinder 45 pulls the bellows 44 to expand the bellows 44, or pushes the bellows 44 to compress the bellows 44.

The pump 10 performs one cycle of operation every time the bellows 44 are pulled to draw the resist solution into the pump chamber 44a (first operation) and are pushed to force the solution from the pump chamber 44a (second operation). Any pump of this type is generally known as "single-action pump" since it forces liquid in one direction only.

The inlet value 40 comprises a first valve seat 40a and a first spherical valve body 40b. The valve body 40b rests in the first valve seat 40a, closing the inlet valve 40. The outlet valve 41 comprises a second valve seat 41a and a second spherical valve body 41b. The valve body 41b is the second valve seat 41a, opening the outlet valve 41. When the bellows 44 are pulled in the direction of arrow αx, increasing the volume of the pump chamber 44a, the pressure in the chamber 44a falls below the pressure in the resist solution pipe 8. In this case, the first valve body 40b is drawn from the first valve seat 40a, thus opening the inlet valve 40, while the second valve body 41b is pushed onto the second valve seat 41a, thus closing the outlet valve 41. As a result, the resist solution is drawn into the pump chamber 44a from the upstream-side (gas collecting tank 16). That is, the single-action pump 10 performs the first operation.

When the bellows 44 are pushed in the direction of arrow β, decreasing the volume of the pump chamber 44a, the pressure in the chamber 44a rises above the pressure in the resist solution pipe 8. In this case, the first valve body 40b is pushed onto the first valve seat 40a, thus closing the inlet valve 40, while the second valve body 41b is drawn from the second valve seat 41a, thus opening the outlet valve 41. The resist solution is forced out of the pump chamber 44a to the downstream-side (filter 12). Namely, the single-action pump 10 performs the second operation.

The sensors 37 and 38 cooperate to determine which operation the pump 10 is performing, the first operation or the second operation. The sensor 37 has a light-emitting element 37a and a light-receiving element 37b. Similarly, the sensor 38 has a light-emitting element 38a and a light-receiving element 38b. A plate 47 is secured to that end of the bellows 44 which is coupled to the air cylinder 45. When the plate 47 crosses the optical path between the elements of each sensor, the sensor detects an approach of the bellows 44.

The control section 30 can detects that the pump 10 is drawing the solution, when the plate 47 secured to the bellows 44 crosses the optical paths of both sensors 37 and 38. And the control section 30 can detect that the pump 10 is discharging the solution, when the plate 47 crosses neither the sensor 37 nor the sensor 38.

The control section 30 operates the downstream control valve 11 and the upstream control valve 15 sequentially, thereby drawing, deaerating and discharging the solution.

The sequence of these operations will be explained, with reference to the timing chart of FIG. 3.

At time t1, the upstream control valve 15 remains closed, and the bellows 44 of the single-action pump 10 are pulled to draw the solution. The inlet valve 40 is thereby opened, whereby the solution is drawn into the bellows 44. Since the upstream control valve 15 remains closed, a negative pressure (pressure reduce) is generated in the single-action pump 10 and also in that part of the resist solution pipe 8 which extends between the pump 10 and the upstream control valve 15. Due to the negative pressure, the resist solution in this part of the pipe 8 has its gas-solubility decreased. The gas dissolved in the resist solution therefore changes into bubbles.

The negative pressure in the pipe 8 can be set at any desired value by varying the length of that part of the pipe 8 which extends between the single-action pump 10 and the upstream control valve 15. That is as the single-action pump 10 draws 2 milliliters of the solution at one time, which is equal to the amount of the solution that the pump 10 discharge at a time, a desired value for the negative pressure can be determined by the inner volume of that part of the pipe 8 which extends between the single-action pump 10 and the upstream control valve 15. In the present embodiment, this part of the pipe 8 is 2 m long and has an inner diameter of 4.35 mm.

The time for which the negative pressure exists in that part of the resist solution pipe 8 is important, as well. In the embodiment, the upstream control valve 15 is opened at time t2, or upon lapse of 2 seconds after the sensor 37 or 38 detect that the bellows 44 are pulled. The resist solution is thereby supplied from the resist solution tank 7 to that part of the pipe 8. As a result, the negative pressure no longer exists in this part of the resist solution pipe 8.

The amount in which the resist solution is supplied at a time from the resist tank 7 is 2 milliliters and is equal to the amount of solution which the pump 10 draws at one time. Therefore, the solution including bubbles subsequently passes through the gas collecting tank 16. The bubbles collected in the tank 16 is eventually discharged at regular time intervals from the tank 16 through the exhaust pipe 16a.

Then, at time t3, the bellows 44 of the single-action pump 10 are pushed to discharge the resist solution, and thereby the outlet valve 41 is opened. As result, the resist solution drawn into the pump chamber 44a is forced through the outlet valve 41 toward the downstream control valve 11.

As the bellows 44 are pushed, the sensors 37 and 38 detect this event. In accordance with the outputs of the sensors 37 and 38, the control section 30 closes the upstream control valve 15 and opens the downstream control valve 11 at time t4. As a result, the resist solution is supplied to the resist coating nozzle 20 through the resist solution pipe 8 and applied from the nozzle 20 to the wafer 3. The wafer 3 is thereby coated with the resist solution.

At time t5 when the pressure in the pipe 9 balances with the pressure in the pump chamber 44a at time t5, the bellows 44 of the single-action pump 10 are pulled to draw the resist solution. The sensors 37 and 38 detects this event, whereby the control section 30 closes the downstream control valve 11 at time t6.

At time t5, the single-action pump 10 finishes one cycle of operation, and starts the next cycle of operation (t1). That is, the sequence of operations at times t2, t3, t4 and t5 is repeated. Forming of bubbles, drawing of the solution (deaeration), and discharge of the solution are thereby performed intermittently.

In the embodiment of the invention, a negative pressure is generated in the single-action pump 10 and also in that part of the resist solution pipe 8 which extends between the pump 10 and the upstream control valve 15. The negative pressure causes the gas dissolved in the resist solution to turn into bubbles. This helps to deaerate the resist solution with high efficiency.

Generally, various gases, such as oxygen, nitrogen, argon, carbon dioxide, are dissolved in resist solution. The gases may turn into bubbles in the resist solution pipe connected to a resist coating nozzle. If this happens, the solution will be applied to the wafer in an amount smaller than is desired, inevitably forming a resist film of an uneven thickness on a wafer. The resist solution is applied in a small amount, only a few milliliters each time. All the more for this, bubbles may greatly impair the thickness uniformity of the resist film.

Furthermore, if the gas dissolved in the solution changes into bubbles in the resist coating nozzle, the bubbles will remain in the resultant resist film, adversely influencing the patterning of the resist film.

In the present invention, the upstream control valve 15 is provided at the downstream of the single-action pump 10, and a negative pressure is generated in that part of the resist solution pipe 8 which extends between the pump 10 and the valve 15 as the pump 10 draws the resist solution into the bellows 44 and discharge it from the bellows 44. The negative pressure decreases the gas-solubility of the solution in this part of the pipe 8, whereby the gas dissolved in the solution turns into bubbles. The gas is therefore be removed from the solution while the solution remains in this part of the pipe 8, though it cannot be removed in normal conditions. Hence, no bubbles will be formed in the resist solution in any other part of the pipe 8. Particularly, forming of bubbles can be reliably prevented in that part of the pipe 8 which is connected to the resist coating nozzle 20.

The present invention is not limited to the embodiment described above. Various changes and modifications can be made, without departing from the scope of the invention.

More specifically, the value of the negative pressure is not limited to the value obtained in the embodiment described above. The negative pressure may have any other value, so long as it serves to deaerate the process solution. It is desired that the value of the negative pressure be set based on the time for which the negative pressure remains in said that part of the resist solution pipe 8. The time is not limited to the value set in the embodiment described above, either.

As described above, the process solution supplying apparatus is not limited to the resist solution supplying apparatus 2. Rather, it may be a developing solution supplying apparatus designed to supply a developing solution to a developing apparatus.

In the embodiment described above, the downstream end of the resist solution pipe 8 is directly connected to the nozzle 20. (Namely, the nozzle unit 4 is a straight type.) Instead, the downstream end of the pipe 8 may be connected to a liquid reservoir and a plurality of nozzles may extend from the reservoir. (Namely, a multi-nozzle unit, or a shower nozzle unit, may be used.)

The means for driving the single-action pump is not limited to air sources. The single-action pump may be driven by motors.

Further, a suck-back valve (may be provided at the down-stream of the downstream control valve 11. This valve is a special type designed to prevent air from being drawn from the downstream end of the resist solution pipe.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A process solution supplying apparatus comprising:
   a solution source from which a process solution is supplied;
   a supply pipe having an upstream end and a downstream end and connected at the upstream end to the solution source;
   a nozzle connected to the downstream end of the supply pipe;
   a pump provided on the supply pipe, for supplying the process solution from the solution source to the nozzle;
   an upstream control valve provided on the supply pipe and located between the pump and the solution source;
   a deaerating mechanism provided between the pump and the upstream control valve, for removing gases from the process solution; and
   a control section for controlling timing of opening and closing the upstream control valve and timing of drawing the process solution into the pump to remove gases from the process solution.

2. An apparatus according to claim 1, wherein the control section causes the pump to draw the process solution, with the upstream control valve closed, thereby to reduce the pressure in the supply pipe between the upstream control valve and the pump and to make the gas dissolved in the process solution turn into bubbles.

3. An apparatus according to claim 2, wherein the control section causes the pump to start drawing the process solution, with the upstream control valve closed, and opens the upstream valve while the pump is drawing the process solution, thereby to cause the process solution to flow in the supply pipe between the upstream control valve and the pump, and the deaerating mechanism moves the gas in the form of bubbles.

4. An apparatus according to claim 1, wherein the control section further causes the pump to discharge the process solution after the deaerating mechanism has removed the bubbles from the process solution.

5. An apparatus according to claim 1, which further comprises a downstream control valve provided on the supply pipe between the pump and the nozzle, and in which the control section opens the downstream control valve to cause the pump to discharge the process solution.

6. An apparatus according to claim 1, wherein the pump has a solution holding section for holding the process solution and performs a first operation to draw the process solution into the solution holding section and a second operation to discharge the process solution from the solution holding section.

7. An apparatus according to claim 6, further comprising a first detector and a second detector, both provided in the pump, for detecting termination of the first operation and termination of the second operation, respectively.

8. An apparatus according to claim 6, wherein the pump has bellows forming the solution holding section, a suction valve mechanism allowing the process solution only to flow into the bellows, and a discharge valve mechanism allowing the process solution only to be discharged from the bellows.

9. An apparatus according to claim 1, wherein the deaerating mechanism has a gas collecting tank, an exhaust passage, for exhausting gas collected in the gas collecting tank, and a valve for opening and closing the exhaust passage.

10. A process solution supplying method for intermittently supplying a process solution by means of a pump, comprising the steps of:

closing the first solution passage provided at an upstream of the pump;

removing gas from the process solution by drawing the process solution into the pump from the first solution passage for a certain period of time while closing the first solution passage, thereby generating a negative pressure in the first solution passage;

opening the first solution passage after the certain period of time, thereby removing the gas from the first solution passage; and discharging the process solution from the pump into a second solution passage provided at a downstream of the pump, after removing the gas from the first solution passage.

11. A method according to claim 10, wherein the step of discharging the process solution is performed after the first solution passage has been closed.

12. A method according to claim 10, wherein the pump has a solution holding section for holding the process solution, the step of removing the gas is performed by conducting a first operation to draw the process solution into the solution holding section, and the step of discharging the process solution is performed by conducting a second operation to discharge the process solution from the solution holding section.

13. A method according to claim 10, wherein the first solution passage is closed and the second solution passage is opened at the same time, thereby to conduct the second operation, when termination of the first operation is detected; the second solution passage is closed, thereby to conduct the first operation, when termination of the second operation is detected; and the first solution passage is closed upon lapse of a predetermined time from the start of the first operation.

14. A method according to claim 10, wherein the pump has bellows forming the solution holding section, a suction valve mechanism allowing the process solution only to flow into the bellows, and a discharge valve mechanism allowing the process solution only to be discharged from the bellows.

* * * * *